US007875256B2

(12) United States Patent
Chang et al.

(10) Patent No.: US 7,875,256 B2
(45) Date of Patent: Jan. 25, 2011

(54) METHOD FOR PRODUCING CARBON NANOCOILS

(75) Inventors: Shuo-Hung Chang, Taipei (TW); Bing-Chen Wei, Yonghe (TW); Neng-Kai Chang, Sindian (TW)

(73) Assignee: National Taiwan University (TW)

( * ) Notice: Subject to any disclaimer, the term of this patent is extended or adjusted under 35 U.S.C. 154(b) by 355 days.

(21) Appl. No.: 12/155,036

(22) Filed: May 29, 2008

(65) Prior Publication Data

US 2009/0169464 A1  Jul. 2, 2009

(30) Foreign Application Priority Data

Dec. 27, 2007 (TW) .............................. 96150556 A (51) Int. Cl.
*C01B 31/26* (2006.01)
(52) U.S. Cl. .............................. 423/445 B; 423/447.1; 423/447.3; 977/843
(58) Field of Classification Search .............. 423/447.3, 423/445 B, 447.1; 977/743, 843
See application file for complete search history.

(56) References Cited

U.S. PATENT DOCUMENTS 6,558,645 B2 * 5/2003 Nakayama et al. ...... 423/445 B

OTHER PUBLICATIONS

Wenzhi Li et al., "A Structure Model and Growth Mechanism for Novel Carbon Nanotubes," Journal of Materials Science, 1999, pp. 2745-2749, vol. 34, Kluwer Academic Publishers.

S. Amelincks et al., "A Formation Mechanism for Catalytically Grown Helix-shaped Graphite Nanotubes," Science, Jul. 29, 1994, pp. 635-639, vol. 265.

Nobuharu Okazaki et al., "Synthesis of Carbon Tubule Nanocoils Using Fe-In-Sn-O Fine Particles as Catalysts," J. Phys. Chem. B, Aug. 27, 2005 pp. 17366-17371, vol. 109, American Chemical Society.

Seiji Motojima et al., "Growth of Regularly Coiled Carbon Filaments by Ni Catalyzed Pyrolysis of Acetylene, and their Morphology and Extension Characteristics," Appl. Phys. Lett., Jan. 22, 1990 pp. 321-323, vol. 56, American Institute of Physics.

W. R. Davis et al., "An Unusual Form of Carbon," Nature, Apr. 25, 1953 p. 756, vol. 171, Nature Publishing Group.

* cited by examiner

*Primary Examiner*—Stuart Hendrickson
*Assistant Examiner*—Richard M Rump
(74) *Attorney, Agent, or Firm*—Bacon & Thomas, PLLC (57) ABSTRACT

The present invention discloses a method for producing carbon nanocoils, which comprises: providing a metal substrate; depositing a tin precursor on the substrate; heating the substrate with the precursor to a predetermined temperature to form a catalyst on the substrate; placing the substrate in a quartz tube furnace; and introducing carbon source gas and protective gas into the quartz tube furnace to allow carbon nanocoils to grow on the surface of the catalyst. Another method for producing carbon nanocoils is also disclosed, which includes: depositing a mixed solution of iron acetate and tin acetate on a substrate; heating the substrate with the mixing solution to a predetermined temperature to form a catalyst on the substrate; placing the substrate in a quartz tube furnace; and introducing carbon source gas and protective gas into the quartz tube furnace to allow carbon nanocoils to grow on the surface of the catalyst.

8 Claims, 6 Drawing Sheets

METHOD FOR PRODUCING CARBON NANOCOILS

BACKGROUND OF THE INVENTION

1. Field of the Invention

The present invention relates to a method for producing carbon nanocoils, and more particularly relates to a method comprising: providing catalyst on the metal substrate, and growing carbon nanocoils efficiently from the catalyst surface under the atmosphere of a carbon-based gas.

2. Description of Related Art

A carbon nanocoil is a hollow tubule presented in a helical shape and constituted from carbon atoms. In 1953, Davis et al. proposed the discovery of a helical shape appearing in some carbon tubules, wherein the diameter of such helical-shaped carbon tubules was at micro-level and so were called vermicular threads (Nature vol. 171, p 756). Afterwards, some studies were directed to those carbon micro-coils. However, such carbon micro-coils are difficult to manufacture for the commercial use because the repeatability of the producing of the carbon micro-coils is very low.

In the 1990s, Motojima et al. developed a method of effectively fabricating a great quantity of micro-carbon coils, and the repeatability is high (App. Phys. Lett. Vol. 56, p 321). In such method, nickel as a catalyst is plated on graphite used as a base, and the base is then placed in a quartz tube (which is known as a reaction carrier), followed by heating in a quartz tube furnace at 750° C.-800° C. with the adding of acetylene, hydrogen, nitrogen, and divinylene sulfide to grow micro-carbon coils.

In 1994, carbon coils having diameter of nano-sized were developed by Amelinckx et al. (Science vol. 265, p 635). These carbon nanocoils are well-graphitized and extremely thin coiled nanotubules (the coil diameter of the smallest one is about 12 nm). They are produced by using metal particles, such as iron, cobalt, and nickel, as catalyst, heated to about 600° C. to 700° C., and induced with the mixture of acetylene and benzene to grow carbon nanocoils. However, the output quantity and the yield of the carbon nanocoil is not ideal, sometimes accompanied with some undesired straight carbon tubules.

In 1999, carbon coils having diameter of nano-sized were developed by Li et al. (J. Material Sci. vol. 34, p 2745). These carbon nanocoils are prepared by covering a graphite sheet with iron particles (granule, whereafter the catalyst was heated to 700° C., and a mixture of acetylene and nitrogen (1:9) was supplied at the rate of 1000 sccm to perform growth. However, the yield of the carbon nanocoil was still disappointingly low, and such method cannot be applied to large quantity manufacture for commercial use.

In 2005, Nakayama et al. (J. Phys. Chem. B 109, 17366) used Fe—In—Sn—O fine particles as catalysts depositing on a substrate for synthesizing carbon nanocoils by catalytic thermal chemical vapor deposition. The carbon nanocoils were produced as follows. Iron chloride (FeCl3), indium chloride (InCl3), and tin chloride (SnCl3) were first dissolved in deionized water with the same concentration, and then these solutions were mixed with appropriate ratios. An alkaline solution, i.e. an aqueous solution of ammonium carbonate ((NH4)2-CO3), was added to this ion solution to precipitate hydroxides of iron, indium, and tin. The hydroxides were dried on a substrate surface, and heated under 600° C. for 2 hours to perform metal hydroxide catalysts. Fine particle catalysts were put in the quartz tube reactor and then heated to 700° C. in a helium (He) atmosphere at the rate of 200 sccm. After heating to 700° C., acetylene gas was supplied at the rate of 60 sccm for 30 min to perform catalytic thermal chemical vapor deposition. However, the substrates used in the above methods were usually made of graphite or silicon wafer, which are expensive and limited to small size and inconsistent shape, thus the cost is always high and it is difficult for large quantities to be manufactured.

Although the yield is higher by using oxides of Fe—In—Sn as catalysts to provide carbon nanocoils, it is inconvenient for the preparation of the raw materials because the kinds of the raw materials are complex, and the process cannot proceed if there is any one of the raw materials absent. Consequently, the method of the prior art is difficult for large quantity production.

As a result, it is a present need to develop a novel method of providing carbon nanocoils with low cost and large quantity production.

SUMMARY OF THE INVENTION

The present invention is designed to solve the above problems.

An object of the present invention is to provide a method for producing carbon nanocoils by using a metal sheet as a substrate, thus the cost can be reduced and the output quantity can be enlarged.

The first mode of the present invention provides a method of providing carbon nanocoils, which comprises: (a) providing a metal substrate; (b) forming a tin precursor on the surface of the metal substrate; (c) heating the substrate and the precursor to a predetermined temperature to form a catalyst on the metal substrate; (d) placing the metal substrate into a reaction furnace; and (e) introducing carbon-based gas and protective gas into the reaction furnace to grow carbon nanocoils on the surface of the catalyst.

According to the first mode of the present invention, the metal substrate of step (a) is not limited but preferably is made from iron-containing metal, or alloy thereof.

According to the first mode of the present invention, the iron-containing metal or alloy is not limited but preferably is stainless steel, cast iron, or pure iron.

According to the first mode of the present invention, the tin precursor of the step (b) is not limited but preferably is formed on the substrate by deposition.

According to the first mode of the present invention, the tin precursor of the step (b) is not limited but preferably is formed on the substrate by sputtering.

According to the first mode of the present invention, the tin precursor of the step (b) is not limited but preferably is nano-sized tin particles, tin salts, or tin oxides.

According to the first mode of the present invention, the heating process of step (c) is not limited but preferably is performed under oxygen-containing atmosphere at the temperature of 400-900° C.

According to the first mode of the present invention, the step (d) is preferably placing the metal substrate in a reaction carrier, then together placing them into the reaction furnace.

According to the first mode of the present invention, the reaction furnace is not limited but preferably is a quartz tube furnace.

According to the first mode of the present invention, the method of providing carbon nanocoils may further comprise a step (d1) between step (d) and step (e): providing a protective gas, heating the substrate and the precursor to 500-800° C. under the protection of the said protective gas.

According to the first mode of the present invention, the substrate and the precursor of step (d1) is preferably heated to the temperature of 700° C.

According to the first mode of the present invention, the carbon-based gas of step (e) is not limited but preferably is methane, ethylene, acetylene, or the combinations thereof.

According to the first mode of the present invention, the protective gas of step (e) is not limited but preferably is nitrogen, inert gas, or the combinations thereof.

According to the first mode of the present invention, the carbon nanocoils of the step (e) are preferably grown for 5-60 minutes.

The second mode of the present invention provides a method of providing carbon nanocoils, which comprises: (a) providing a substrate; (b) forming a mixed solution of iron acetate and tin acetate on the surface of the substrate; (c) heating the substrate and the solution to a predetermined temperature to form a catalyst on the substrate; (d) placing the substrate and the catalyst into a reaction furnace; and (e) introducing carbon-based gas and protective gas into the reaction furnace to grow carbon nanocoils on the surface of the catalyst.

According to the second mode of the present invention, the substrate of step (a) is not limited but preferably is a silicon chip, the silicon chip having silicon oxides, quartz, or glass.

According to the second mode of the present invention, the weight ratio between iron and tin element of the mixed solution in step (b) is not limited but preferably is 70:30 to 99:1.

According to the second mode of the present invention, the heating process of step (c) is preferably performed under an oxygen-containing atmosphere at the temperature of 300-500° C.

According to the second mode of the present invention, step (d) is preferably placing the metal substrate in a reaction carrier, then together placing them into the reaction furnace.

According to the second mode of the present invention, the reaction furnace is not limited but preferably is a quartz tube furnace.

According to the second mode of the present invention, the method of providing carbon nanocoils may further comprise a step (d1) between step (d) and step (e): providing a protective gas, heating the substrate and the catalyst to 500-800° C. under the protection of the said protective gas.

According to the second mode of the present invention, the substrate and the catalyst of step (d1) is preferably heated to the temperature of 700° C.

According to the second mode of the present invention, the carbon-based gas of step (e) is not limited but preferably is methane, ethylene, acetylene, or the combinations thereof.

According to the second mode of the present invention the protective gas of step (e) is not limited but preferably is nitrogen, inert gas, or the combinations thereof.

According to the second mode of the present invention, the carbon nanocoils of the step (e) are preferably grown for 5-60 minutes.

Other objects, advantages, and novel features of the invention will become more apparent from the following detailed description when taken in conjunction with the accompanying drawings.

DETAILED DESCRIPTION OF THE PREFERRED EMBODIMENT

A. Preparation of Carbon Nanocoils with Metal Substrates

Figure 1:
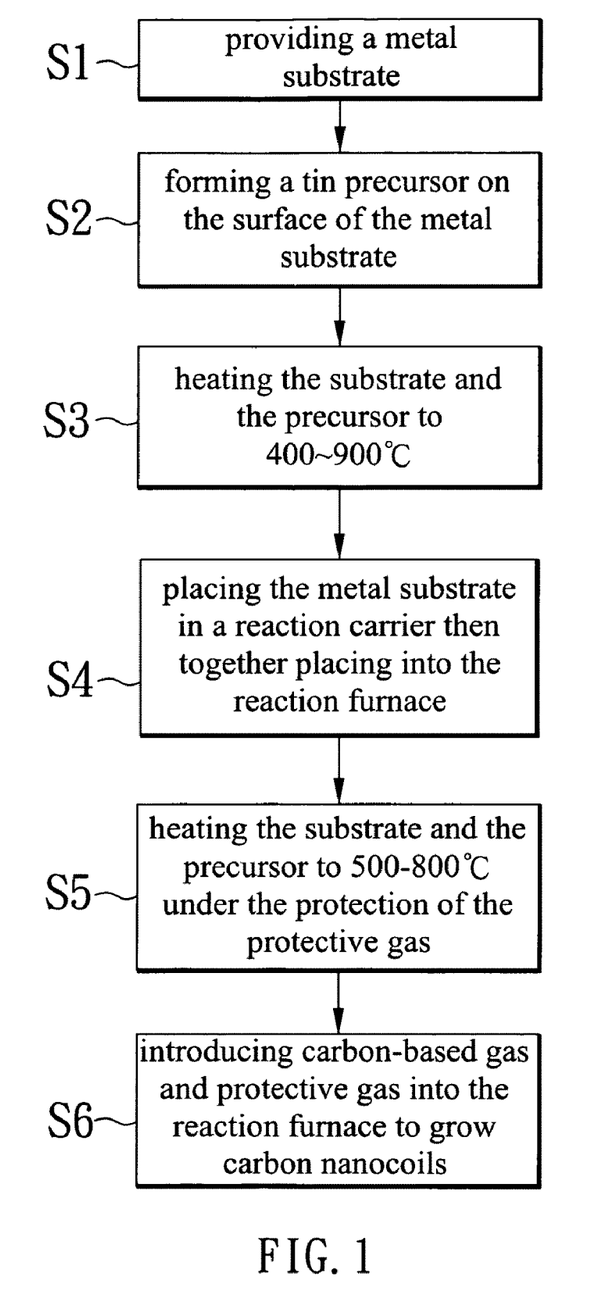
FIG. 1 is a process flow-chart of a method of producing carbon nanocoils, according to an embodiment of the present invention.

Referring to FIG. 1, the method of providing the carbon nanocoils of the present invention comprises: providing a metal substrate (S1); forming a tin precursor on the surface of the substrate (S2); heating the substrate and the precursor to 400~900° C. to form a catalyst on the substrate (S3); placing the metal substrate in a reaction carrier then together placing them into the reaction furnace (S4); providing a protective gas and preheating the substrate (S5); and introducing carbon-based gas and protective gas into the reaction furnace to grow carbon nanocoils on the surface of the catalyst (S6).

Example 1

With reference to FIGS. 1, 2A-2D, which are the process flow-charts of Example 1, first, a metal substrate 10 is provided, which can be made from any substrate containing iron, for example, stainless steel, cast iron, or pure iron. The metal substrate 10 of the present example is made of stainless steel. Then, a tin precursor 20 is formed on the surface of the metal substrate 10. Wherein the tin precursor 20 can be any compound containing tin element, for example, nanoparticle of tin (tin metal); tin salts ($SnCl_3$, or $(C_2H_3O_2)_2Sn$); or tin oxides ($SnO_2$). There is no limit of tin precursor 20, and the tin precursor 20 of the present example is $(C_2H_3O_2)_2Sn$.

Figure 2A:
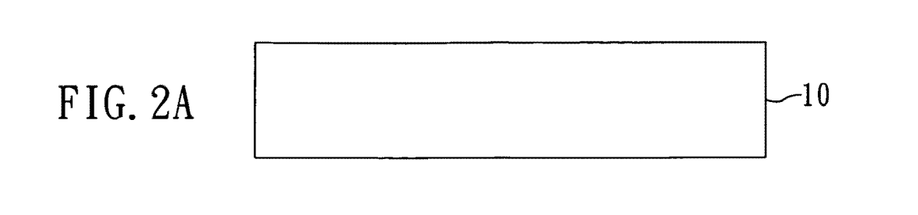
FIG. 2A-2D is a process flow-chart of a method of producing carbon nanocoils, according to an embodiment of the present invention.
Figure 2B:
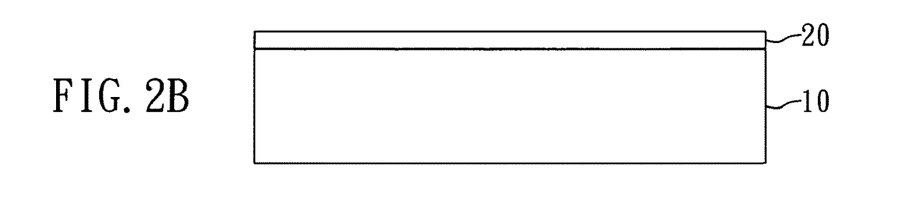

In the present example, the tin precursor 20 is formed on the metal substrate 10 by deposition. That is, tin acetate is first dissolved in a solvent (e.g. organic solvent or water), then the tin acetate solution is uniformly dispersed on the metal substrate 10. In the present example, 10 ml of 0.006 g/ml tin acetate dissolved in isopropanol is used to apply on the metal substrate 10 through dropping.

Then, the metal substrate 10 having tin acetate solution on one surface thereof is heated under oxygen-containing atmosphere at the temperature of 400-900° C. for 30 minutes, and a catalyst 21 (iron-tin oxides) is then formed from the tin acetate solution. In the present invention, the heating process is preferably performed with the condition of 800° C. for 30 minutes.

Afterwards, the metal substrate 10 having catalyst 21 on one surface thereof is placed in a reaction carrier (not shown), followed with placing the reaction carrier into a chamber of a quartz tube furnace, and then heating to a predetermined temperature under the atmosphere of a protective gas. The reaction carrier used herein can be any reaction carrier known in the art, and the reaction carrier used in the present example is a quartz reaction carrier. The protective gas can be any inert gas (for example, argon or helium gas) or nitrogen gas, in which the protective gas used herein is argon gas. The heating temperature can be in the range of 500-800° C., while the heating condition used herein is 700° C.

Figure 2C:
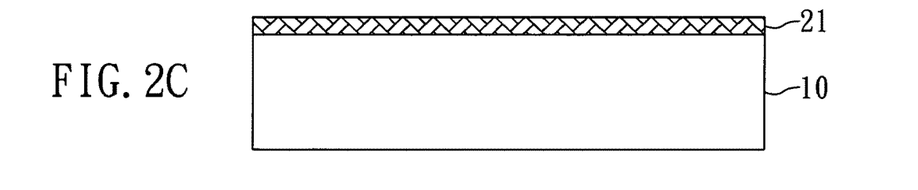
Figure 2D:
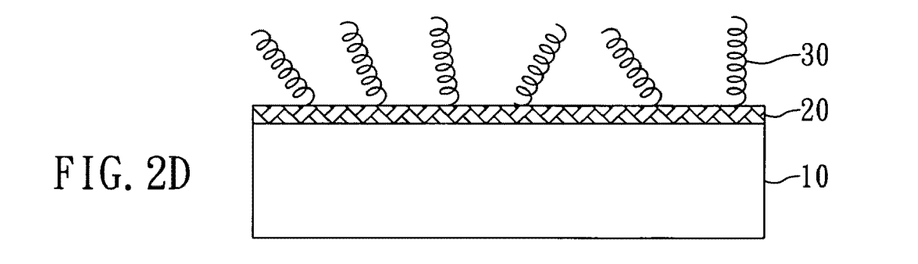
Figure 3:
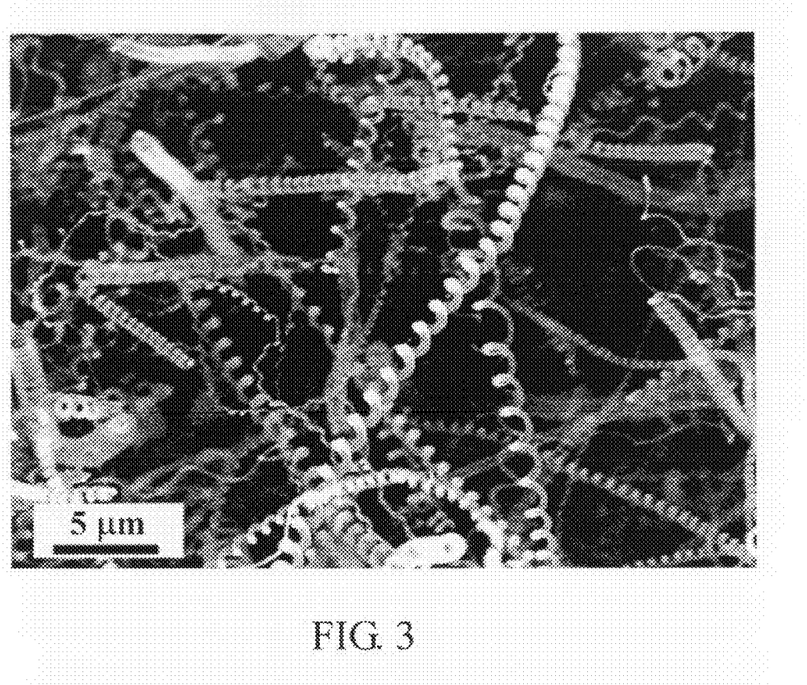
FIG. 3 is an SEM photo of the nanocoils according to Example 1 of the present invention.

The mixture of a carbon-based gas and a protective gas is then introduced into the chamber. The carbon-based gas is not limited but preferably is a hydrocarbon gas, for example, methane, ethylene, acetylene, etc., and the carbon-based gas used herein is acetylene. The protective gas can be any inert gas or nitrogen gas, in which the protective gas used herein is argon gas. The flow rates of the carbon-based gas and the protective gas differ according to the different atmospheric temperature, and should be under control. In the present example, the condition is: 700° C. of the temperature, 30% or less of the carbon-based gas partial pressure. When the carbon-based gas partial pressure is over 30%, too much thermo cracking will occur, whereby the catalyst will surround by enormous heterogeneous carbon fibers and thus the ability of growing carbon-nanocoils is lost. Therefore, the carbon-based gas partial pressure should be controlled at 30% or less. Finally, the carbon nanocoils 30 are grown from the metal substrate 10 for 5-60 minutes as shown in FIG. 2C. The SEM photo of the obtained carbon nanocoils 30 is presented in FIG. 3.

Example 2

Referring to FIGS. 1, 2A-2D, first, a tin metal layer with thickness of 1 nm-20 nm is formed on the metal substrate 10 with Electron Beam Evaporation Deposition method. Then the metal substrate 10 having the tin metal layer is heating at 500° C. for 30 minutes to form an oxide catalyst of (Fe, Sn) 21. Afterwards, the metal substrate 10 having the catalyst 21 on one surface thereof is placed in a reaction carrier (not shown), following with placing the reaction carrier into a chamber of a quartz tube furnace. Under the protection of the protective gas, the metal substrate 10 is heated to a preferred temperature. Wherein, the protective gas can be any inert gas (for example, argon or helium gas) or nitrogen gas, while the protective gas used herein is argon gas. The heating temperature can be in the range of 500-800° C., while the heating condition used herein is 700° C.

Figure 4:
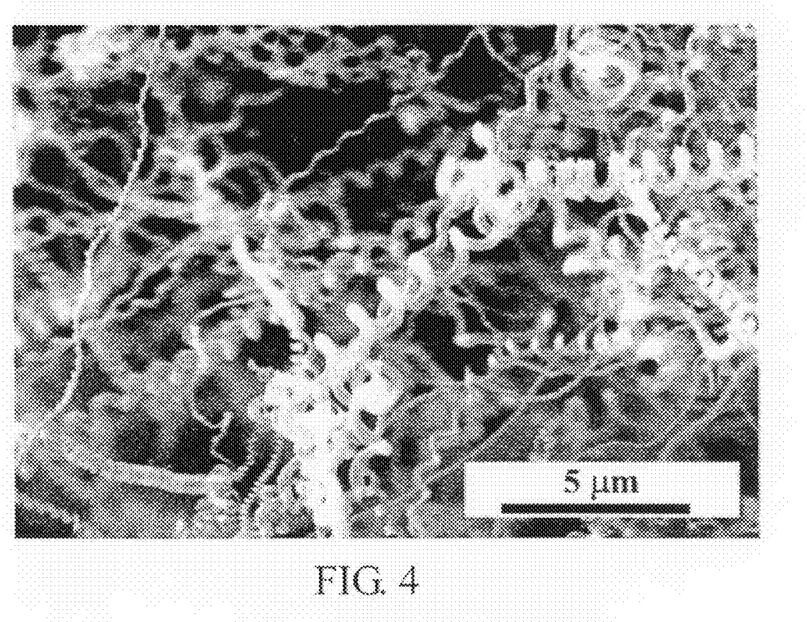
FIG. 4 is an SEM photo of the nanocoils according to Example 2 of the present invention.

The gas mixture of carbon-based gas and protective gas is then introduced into the chamber. The carbon-based gas is not limited but preferably is hydrocarbon, for example, methane, ethylene, acetylene, etc., and the carbon-based gas used herein is acetylene. The protective gas can be any inert gas or nitrogen gas, in which the protective gas used herein is argon gas. The flow rates of the carbon-based gas and the protective gas differ according to the different atmospheric temperature, and should be under control. In the present example, the condition is: 700° C. of the temperature, 30% or less of the carbon-based gas partial pressure. When the carbon-based gas partial pressure is over 30% too much thermo cracking will occur, and the catalyst surrounded by enormous heterogeneous carbon fibers thus loses the ability of growing carbon-nanocoils. Therefore, the carbon-based gas partial pressure should be controlled at 30% or less. Finally, the carbon nanocoils 30 are grown from the metal substrate 10 for 5-60 minutes. The SEM photo of the obtained carbon nanocoils 30 is presented in FIG. 4.

From the above examples, the tin precursor 20 can be formed on the metal substrate 10 with the Electron Beam Evaporation Deposition method, thermo deposition, sputtering, or other general depositing methods, but is not limited thereto.

However, the critical mechanism of growing carbon nanocoils is still indistinct, possibly suggesting that an Fe—Sn alloy will form after heat treatment with iron and tin catalyst, and then the carbon elements permeate into the iron part of the Fe—Sn alloy when the carbon gas is thermo cracked into carbon elements, more carbon elements are formed and are over saturated in the catalyst of Fe, thus the carbon nanocoils are grown from the border between the Fe and Sn region of the Fe—Sn alloy. In the region of the border between the Fe and Sn of the alloy, there is a higher carbon growing rate nearing the iron part, and the carbon growing rate nearing the tin part is slower instead. Thus, the carbon nanotubes, which should grow in a straight line, in fact roll up to form carbon nanocoils with helical shapes because of the different growing rate at the border between the Fe and Sn of the alloy.

The metal substrate used in the method of producing carbon nanocoils of the present invention has the advantages of low-cost, large-area growing (because of the extendable character of the metal), and the carbon nanocoils are able to grow on a metal having any shape comparing to the traditional method using graphite or silicon wafer as the substrate. Meanwhile, it may also apply to electromagnetic wave absorbing materials, nano electromagnetic actuators, and nano sensors for more functional application, because the metal substrate itself already has electrical conductivity. Particularly, those advantages obtained from the metal substrate cannot be realized from the graphite or silicon wafer substrate of the prior art.

Besides, the productivity of the method of the prior art is low, because the preparing procedures are complex, the raw materials used are various, and the mixed solvent provided in the substrate should be prepared under some fixed ratio of metal ions, for example, the ratio of iron chloride, indium chloride, and tin chloride in the mixing solution is limited. However, only a tin precursor is needed to be formed on the metal substrate because the metal substrate itself already contains iron elements inside. The process of the method of the present invention is very simple, and the raw material used is also very simple, thus the economical efficiency is improved. Therefore, the method of the present invention is a novel practical way for producing carbon nanocoils.

Figure 5:
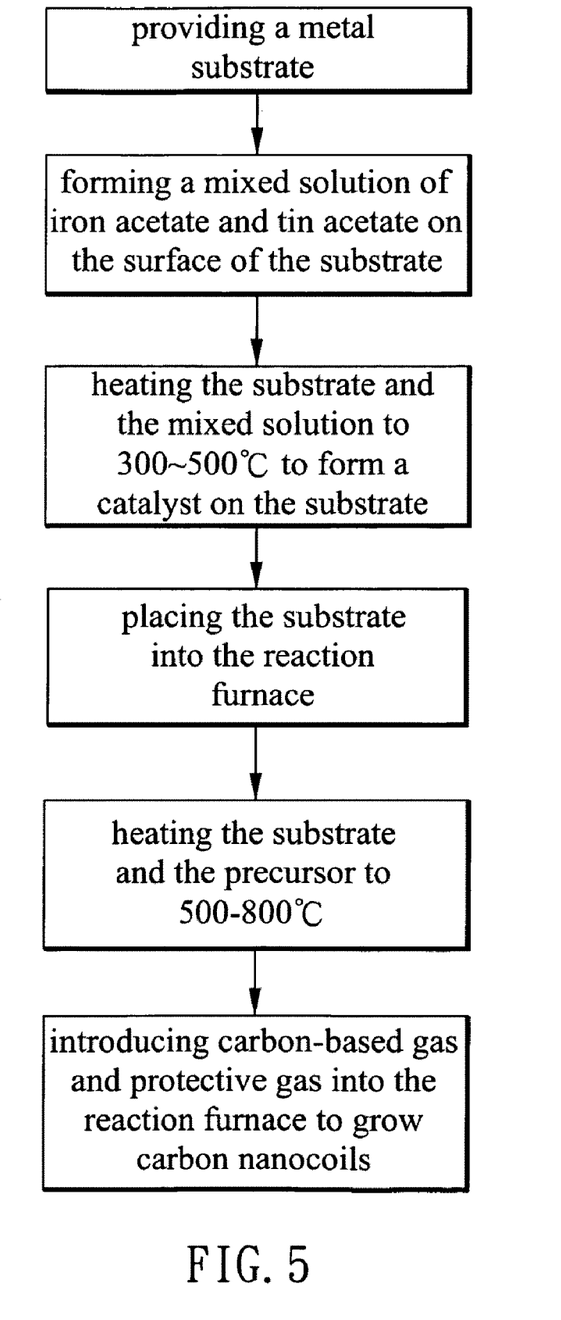
FIG. 5 is a process flow-chart of a method of producing carbon nanocoils, according to another embodiment of the present invention.

B. Preparation of Carbon Nanocoils with $(C_1H_3O_2)_2$Fe and $(C_2H_3O_2)_2$Sn as Catalyst Referring to FIG. 5, the method of providing the carbon nanocoils of the present invention comprises: providing a substrate (S1); forming a mixed solution of iron acetate and tin acetate on the surface of the substrate (S2); heating the substrate and the mixed solution to 300~500° C. to form a catalyst on the substrate (S3); placing the substrate into the reaction furnace (S4); providing a protective gas and preheating the substrate (S5); and introducing carbon-based gas and protective gas into the reaction furnace to grow carbon nanocoils on the surface of the catalyst (S6).

Example 3

Referring to FIGS. 6A-6D, first, a substrate 40 (n-type silicon wafer, silicon wafer or quartz or glass having silicon oxide on the surface thereof can be selected) is provided, the substrate 40 used herein is a silicon wafer having silicon oxide on the surface thereof. Then, $(C_2H_3O_2)_2$Fe and $(C_2H_3O_2)_2$Sn are mixed in a solvent (e.g. organic solvent or water) to produce a mixed solution, and the mixed solution is provided uniformly on the substrate 40. In the present example, the weight ratio between iron and tin element of the mixed solution in step (b) is not limited but preferably is 70:30 to 99:1 to improve the yield of the output carbon nanocoils 60.

Figure 6A:
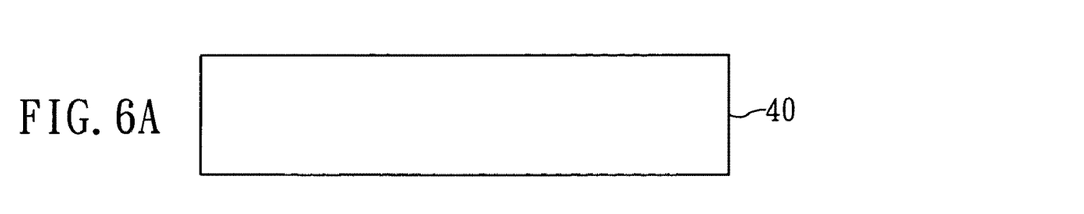
FIG. 6A~6D is a process flow-chart of a method of producing carbon nanocoils, according to another embodiment of the present invention.
Figure 6B:
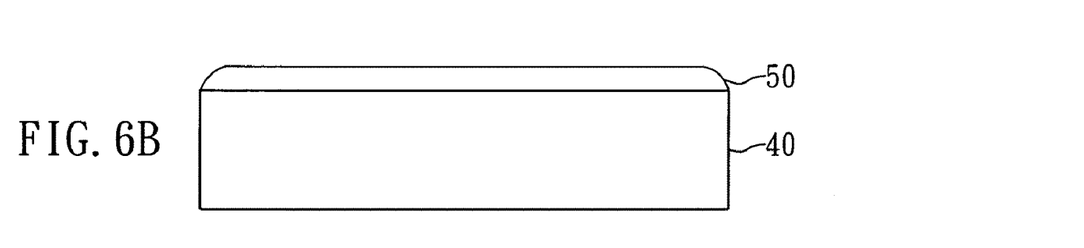

The substrate 40 having the mixed solution 50 of $(C_2H_3O_2)_2Fe$ and $(C_2H_3O_2)_2Sn$ on one side thereof is heated at 300° C.-500° C. for 30 minutes to form an oxide catalyst 51. Then, the substrate 40 is placed in a reaction carrier (not shown), following with placing the reaction carrier into a chamber of a quartz tube furnace. Under the protection of the protective gas, the substrate 40 is heated to a preferred temperature. The reaction carrier used herein can be any reaction carrier known in the art, and the reaction carrier used in the present example is a quartz reaction carrier. The protective gas can be any inert gas (for example, argon or helium gas) or nitrogen gas, in which the protective gas used herein is argon gas. The heating temperature can be in the range of 500-800° C. but preferably is 700° C., while the heating condition used herein is 700° C.

Figure 6C:
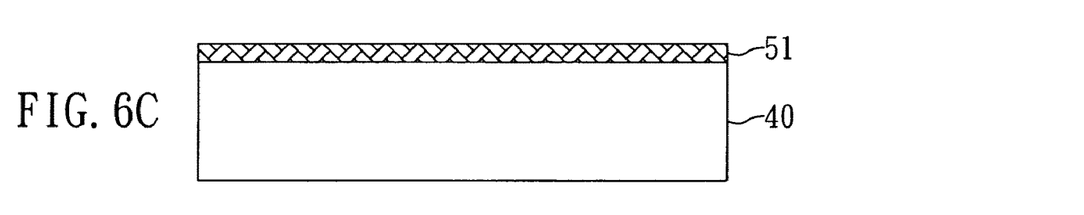
Figure 6D:
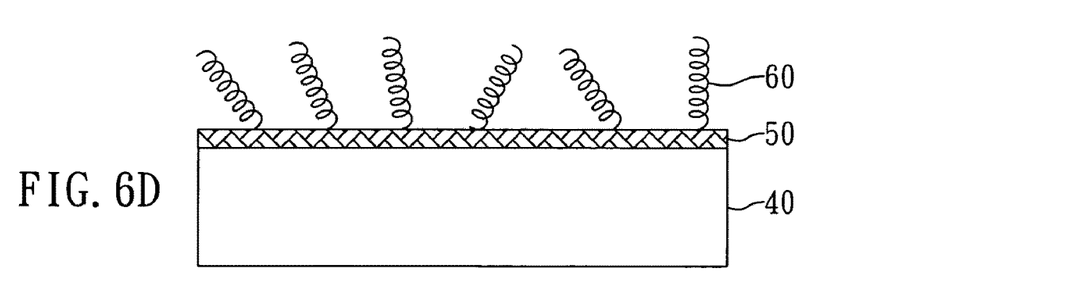
Figure 7:
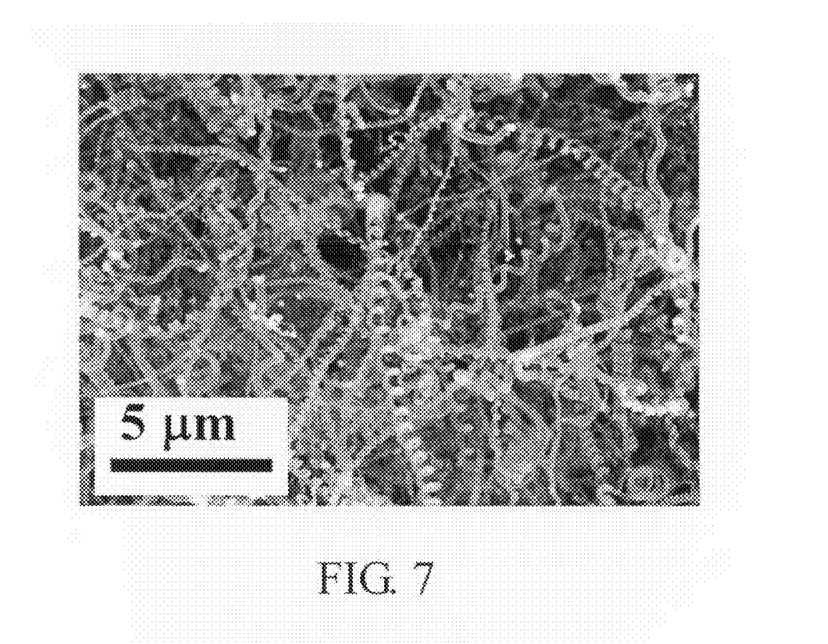
FIG. 7 is an SEM photo of the nanocoils according to Example 3 of the present invention.

The gas mixture of carbon-based gas and protective gas is then introduced into the chamber. The carbon-based gas is not limited but preferably is hydrocarbon, for example, methane, ethylene, acetylene, etc., and the carbon-based gas used herein is acetylene. The protective gas can be any inert gas or nitrogen gas, in which the protective gas used herein is argon gas. The flow rates of the carbon-based gas and the protective gas differ according to the different atmospheric temperature, and should be under control. In the present example, the condition is: 700° C. of the temperature, 30% or less of the carbon-based gas partial pressure. Finally, the carbon nanocoils 60 are grown from the substrate 40 for 5-30 minutes. The SEM photo of the obtained carbon nanocoils 60 is presented in FIG. 7.

Figure 8:
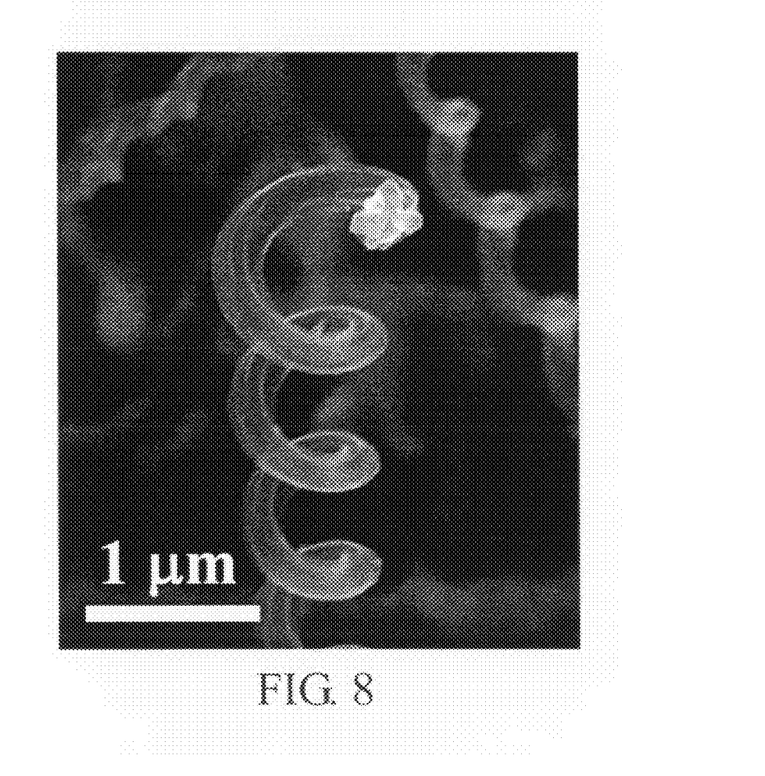
FIG. 8 is another SEM photo of the nanocoils according to Example 3 of the present invention.

As shown in the SEM photo in FIG. 8, the catalyst granule of Fe and Sn is discovered on the tip of the carbon nanocoils. Until the present researching result, the critical mechanism of growing carbon nanocoils is still indistinct, possibly suggesting that an Fe—Sn alloy will be formed after heat treatment with iron and tin catalyst, and then the carbon elements permeate into the iron part of the Fe—Sn alloy when the carbon gas is thermo cracked into carbon elements, more carbon elements are formed and are over saturated in the catalyst of Fe, thus the carbon nanocoils grow from the border between the Fe and Sn region of the Fe—Sn alloy. In the region of the border between the Fe and Sn of the alloy, there is a higher carbon growing rate nearing the iron part, and the carbon growing rate nearing the tin part is slower instead. Thus, the carbon nanotubes, which should grow in a straight line in fact roll up to form carbon nanocoils with helical shapes because of the different growing rates at the border between the Fe and Sn of the alloy.

Compared to conventional methods, the present invention provides a method with high yield, high reproducibility, and simple processes, which uses only Fe and Sn as catalysts. Moreover, not only does this reduce the amount of catalysts variety, compared with the prior art, the method of the present invention needs no further adding of basic-solution (e.g. ammonium carboxylate) to precipitate metal hydroxides, and is able to directly evaporate the solvent from the mixing solution of $(C_2H_3O_2)_2Fe$ and $(C_2H_3O_2)_2Sn$, following with treatment to form the desired catalysts.

The carbon nanocoils produced from the present invention can be further applied into the manufacture of electromagnetic wave absorbing materials, nano electromagnetic actuators, and nano sensors. Moreover, comparing with conventional methods, the present invention provides a method of providing carbon nanocoils with high yield, high reproducibility, and simple processes. Thus, using the method of the present invention is indeed a novel, practical way for a large amount of carbon nanocoils to be produced.

Although the present invention has been explained in relation to its preferred embodiment, it is to be understood that many other possible modifications and variations can be made without departing from the scope of the invention as hereinafter claimed.

What is claimed is:

1. A method for producing carbon nanocoils, comprising following steps:
    (a) providing a substrate;
    (b) forming a mixed solution of iron acetate and tin acetate on the surface of the substrate;
    (c) heating the substrate and the solution to a predetermined temperature to form a catalyst on the substrate;
    (d) placing the substrate and the catalyst into a reaction furnace; and
    (e) introducing carbon-based gas and protective gas into the reaction furnace to grow carbon nanocoils on the surface of the catalyst.

2. The method as claimed in claim 1, wherein the weight ratio between iron and tin element of the mixed solution in step (b) is 70:30 to 99:1.

3. The method as claimed in claim 1, wherein the heating process of step (c) is progressing under an oxygen-containing atmosphere at the temperature of 300-500°.

4. The method as claimed in claim 1, wherein the step (d) is placing the metal substrate in a reaction carrier, then together placing them into the reaction furnace.

5. The method as claimed in claim 1, further comprising a step (d1) between step (d) and step (e): providing a protective gas, heating the substrate and the catalyst to 500-800° under the protection of the said protective gas.

6. The method as claimed in claim 5, wherein the substrate and the catalyst of step (d1) is heated to the temperature of 700°.

7. The method as claimed in claim 1, wherein the carbon-based gas of step (e) is methane, ethylene, acetylene, or the combinations thereof.

8. The method as claimed in claim 1, wherein the protective gas of step (e) is nitrogen, inert gas, or the combinations thereof.

* * * * *